Patented May 12, 1942

2,282,931

UNITED STATES PATENT OFFICE 2,282,931

INSECTICIDAL MERCAPTO-OXAZOLINES

Herman A. Bruson, Philadelphia, Pa., assignor to Röhm & Haas Company, Philadelphia, Pa.

No Drawing. Application April 19, 1941,
Serial No. 389,333

3 Claims. (Cl. 167—33)

This invention relates to insecticidal compositions which are particularly useful in combatting chewing insects and which are relatively free from phytocidal action. These compositions have as an active agent a compound of the formula

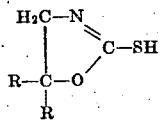

wherein R represents a lower alkyl group such as methyl, ethyl, isopropyl, propyl, isobutyl or butyl. These compounds are desirably applied in conjunction with inert carriers, such as talc, clay, or the like, which are impregnated therewith and may be used in aqueous sprays or in dusts.

While various sulfur compounds have been reported to possess parasiticidal activity, only a relatively few have actually been proved to be sufficiently effective at low concentrations to permit their use against insects on growing plants. As far as insecticidal activity is concerned, the reported sulfur compounds act primarily as repellents or as contact poisons. In one type of the sulfur-containing compounds sulfur occurs in a five-membered ring. In general, however, these compounds have not been acceptable to horticulturists because they lack the necessary balance of effectiveness against insects and safety to growing plants which is required. Some of them are deficient in stability or present hazards to those engaged in their manufacture or application.

The object of this invention is to provide organic insecticides which are useful for the control of chewing insects at low concentrations. A further object is to provide organic insecticides which are safe alike to plants and to higher forms of animal life. A further object is to provide synthetic insecticides of the "stomach-poison" type which may be used in place of lead arsenate or magnesium arsenate. Another object is to provide an insecticidal ingredient which may be used in sprays or in dusts, which may be used in conjunction with other insecticidal principles or with fungicides, and which has value as a repellent and as a contact poison. A still further object is to provide insecticidal compositions which, when applied to plants, limit the feeding of insects thereon.

These objects are accomplished by applying to plants an insecticidal composition having as an active ingredient thereof a 5,5-dialkyl-2-mercapto-oxazoline. These compounds are obtained by reacting carbon disulfide with a β-aminotertiary alcohol of the formula

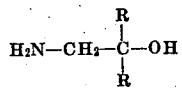

The most readily available of these at the present time is the dimethyl substituted compound which on reaction yields

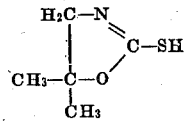

This compound, as well as its homologues, is peculiarly effective in combatting insects and may be applied in sprays or dusts as the sole toxicant or in conjunction with other insecticides and fungicides. For one type of application the toxicant is dissolved in a volatile organic solvent such as acetone and extended with an inert carrier, such as silica or magnesium carbonate. The mixture is then dried and pulverized.

Such a preparation of 5,5-dimethyl-2-mercapto-oxazoline was applied as an aqueous spray containing eight pounds of toxicant in one hundred gallons of water to bean plants in a hothouse. Mexican bean beetle larvae were then placed on the plants. Within 96 hours 90% to 100% of the larvae on the plants were dead, while any showing signs of life had fallen from the plant and were incapacitated, thus giving 100% control. There was no feeding on these plants. Comparison experiments were conducted using magnesium arsenate at eight pounds per 100 gallons. Here only 47% were killed and 10% incapacitated, a control of 57%. Feeding was severe with magnesium arsenate. Further tests were made with a spray containing one pound of 5,5-dimethyl-2-mercapto-oxazoline per 100 gallons of spray (about 0.12% actual toxicant). At this concentration 50% of the larvae were killed within 96 hours and 40% had fallen from the plant and were incapacitated giving a control of 90%. A slight amount of feeding took place, but there was not other indication of any injury to the plant.

The same toxicant was applied in both sprays and dusts to randomized field plots, in accordance with established field testing technique, with excellent results. There was consistently obtained a kill of 90% and higher of Mexican bean beetles on bean plants. The beetles were in both adult and larval stages. Feeding and plant injury were not evident. In these various respects the oxazolines have proven to be far more effective than magnesium arsenate.

There was prepared a stock preparation containing 49.75% of talc, 0.25% of a dispersing agent therefor (the sodium salt of a formaldehyde-condensed octyl sulfonated phenoxyethyl sulfate), 20% of aluminum sulfate, and 30% of 5,5-dimethyl-2-mercapto-oxazoline. This preparation was used at eight pounds per 100 gallons of water to which two pounds of a polyglycerol-fatty acid-phthalic acid condensate had been added to increase wetting action and to serve as a "sticker." This spray was applied to cabbages infested with the cabbage looper and the imported cabbage worm with a control of over 90% of both; to various ornamentals infested with the fall web worm with a control of over 95%; and to catalpa trees infested with catalpa sphinx larvae with a control of over 95%.

A formula in which 5,5-dimethyl-2-mercapto-oxazoline was spread on magnesium carbonate was used at the rate of one-third pound of toxicant per 100 gallons of spray. This spray was applied in replicate to plots of potatoes with a control of over 95% of the larvae of the Colorado potato beetle.

The other 5,5-alkyl homologues are likewise peculiarly effective in controlling chewing insects. It is of interest to note, however, that the oxazolines having the alkyl substituents in the 4-position are of low effectiveness and that the thiazoline analogues tested under the same conditions produced severe injury to plants, even at 0.12%, while giving a low degree of control in some cases and in other cases practically no control at all, for example against such pests as cabbage worms, web worms, etc.

The 5,5-alkyl-2-mercapto oxazolines have value as contact poisons in some cases. For example, a mixture consisting of one part of polyglycerol-coconut oil-phthalic acid condensate, one part of 5,5-dimethyl-2-mercapto-oxazoline, and 2 parts of pine oil was applied in an aqueous spray at 1:300 to bean plants infested with red spiders with a control of over 50%.

The tests of the 5,5-dialkyl-2-mercapto-oxazolines have demonstrated their value as contact poisons and particularly as stomach poisons. The tests show further that they have some degree of repellency and on plants sprayed therewith feeding is at a minimum. These oxazolines also exhibit a high degree of safety to plants at effective concentrations.

I claim:

1. An insecticidal composition containing as an active ingredient a compound of the formula

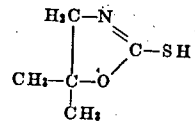

2. An insecticidal composition containing as an active ingredient a compound of the formula

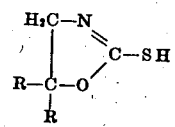

wherein R is a lower alkyl group.

3. An insecticidal composition comprising an inert carrier impregnated with a compound of the formula

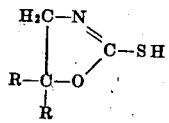

wherein R is a lower alkyl group.

HERMAN A. BRUSON.